United States Patent [19]
Davis et al.

[11] Patent Number: 4,899,040
[45] Date of Patent: Feb. 6, 1990

[54] LIGHT-CONDITIONING APPARATUS FOR AN IMAGE SCANNER ILLUMINATION SYSTEM

[75] Inventors: Michael H. Davis, Marion; Gary L. Erck, Webster, both of N.Y.

[73] Assignee: Eastman Kodak Company, Rochester, N.Y.

[21] Appl. No.: 241,685

[22] Filed: Sep. 8, 1988

[51] Int. Cl.$^4$ .......................... H01J 3/14; G03B 27/00
[52] U.S. Cl. ..................................... 250/216; 250/227; 355/1
[58] Field of Search .................. 355/1, 47, 105, 38, 355/68, 71, 70; 250/227, 216, 236, 234; 350/96.25, 96.24, 96.27

[56] References Cited

U.S. PATENT DOCUMENTS

| | | | |
|---|---|---|---|
| 3,982,829 | 9/1976 | Hirth | 355/1 |
| 4,126,388 | 11/1978 | Kawai | 355/1 |
| 4,186,431 | 1/1980 | Engel et al. | 362/223 |
| 4,195,223 | 3/1980 | Bergmann et al. | 250/216 |
| 4,260,249 | 4/1981 | Armitage, Jr. et al. | 355/67 |
| 4,350,433 | 9/1982 | Seto et al. | 355/1 |
| 4,409,477 | 10/1983 | Carl | 250/227 |
| 4,413,903 | 11/1983 | Corona et al. | 355/1 |
| 4,445,774 | 5/1984 | Spinelli et al. | 355/71 |
| 4,462,662 | 7/1984 | Lama | 355/1 |
| 4,547,813 | 10/1985 | McGraw et al. | 250/237 R |
| 4,568,984 | 2/1986 | Juergensen et al. | 250/236 |
| 4,716,507 | 12/1987 | Ames | 350/96.27 |
| 4,717,939 | 1/1988 | Yanagawa | 355/68 |
| 4,730,895 | 3/1988 | Siedband et al. | 350/96.24 |
| 4,760,421 | 7/1988 | Margolin | 355/1 |

Primary Examiner—David C. Nelms
Assistant Examiner—Michael Messinger
Attorney, Agent, or Firm—Dennis P. Monteith

[57] ABSTRACT

An illumination system for image scanner apparatus that varies the amount of light in an object (film) plane as a function of field angle, to render irradiance at an image sensor relatively uniform with field angle. In a preferred embodiment, an optical converter regulates the irradiance in the object plane as a function of field angle by varying the power radiated along a line of diffuse light projected onto the object plane.

5 Claims, 7 Drawing Sheets

LIGHT-CONDITIONING APPARATUS FOR AN IMAGE SCANNER ILLUMINATION SYSTEM

BACKGROUND OF THE INVENTION

1. Field of the Invention

The present invention relates to image scanning apparatus. More particularly, the invention relates to conditioning the radiance of illumination in an object plane so that the irradiance at an image plane is uniform with field angle.

2. Description of the Prior Art

Image scanning is a process of converting an image recorded on a photosensitive sheet, such as photographic film, to an electronic image. Scanning, as such, is commonly employed as a first step in the transmission of an image from one storage medium to another, or in the enhancement or the analysis of the image prior to its transmission.

With a photographic film held in a given plane, an image scanner measures the optical density of the film by illuminating it with light of known intensity and measuring the amount of light transmitted through, or reflected from, the film. In doing so, the scanner effectively divides the image recorded on the film into discrete picture elements, or pixels, and assigns to each a number or value representing an average density for each pixel. Commonly, the pixels are arranged in rows and columns to form a two-dimensional grid with the density of each pixel corresponding to a relatively small portion of the overall image.

There are various types of image scanning systems known in the art. An image scanning system of the so-called serial type measures the density of only one film pixel at a time. A microdensitometer, for one, employs a very narrow stationary beam of light. An X-Y translation mechanism moves the film in two orthogonal directions relative to the stationary light beam so that a desired area of the film image is scanned.

A laser flying-spot scanner and a CRT flying-spot scanner are also of the serial type—one film pixel is measured at a time. With a flying-spot scanner, however, a movable beam of light scans the film, and lens apparatus, having an appropriate field of view, focuses light impinging on the film onto an image sensor.

A line scanner and an area scanner are two other systems known in the art. With a line scanner, an entire row (or column) of film pixels is illuminated simultaneously by projecting a line of light onto the film. A linear translation device moves the film in a direction orthogonal to the light line to scan the entire film image.

With an area scanner, all film pixels are scanned simultaneously by projecting a relatively broad beam of light onto the entire film image.

A line scanner and an area scanner, like a flying-spot scanner, employ lens apparatus having an appropriate field of view to focus light projected on the film image onto an appropriate image sensor, i.e. a linear sensor in the case of a line scanner and an area sensor (a 2-dimensional CCD, etc.) for an area scanner.

As is appreciated by those skilled in the image scanner art, accuracy in the measuring of film density values is an extremely important performance criterion. The irradiance in an image, however, varies as the field angle of an object or image increases. As disclosed in Applied Optics and Optical Engineering by William C. Wolfe, Volume VIII, page 142, irradiance in an image decreases in proportion to the fourth power of the cosine of the field angle, defined by an optical axis and a line connecting the center of the image and its corresponding object. Thus, an image scanner system that employs either a scanning light beam, a line of light, or a relatively broad light beam for illuminating an area (an image scanner other than a microdensitometer having a stationary narrow beam of light), suffers from a disadvantage in that irradiance at the image sensor varies with field angle.

SUMMARY OF THE INVENTION

In view of the foregoing, it is an object of the present invention to provide image scanner apparatus in which the irradiance at an image sensor, arising from image-bearing light on the sensor, is relatively uniform with field angle. This object is achieved by providing an illumination system for image scanner apparatus that varies the amount of light in an object (film) plane as a function of field angle, to render irradiance at the image sensor relatively uniform with field angle. Our invention, therefore, concerns image scanner apparatus other than a serial scanner having a stationary light beam.

In the context of our inventive contribution, the amount of light in the object plane can be varied as a function of field angle either by adjusting the time that each film pixel is subjected to light of constant power, or by regulating light power, or some combination of both (variable time and variable power). In a preferred embodiment of the invention, an illumination system for image scanner apparatus comprises light-conditioning means that varies the power of light in an object plane as a function of field angle.

In image scanner apparatus of the line scanner type, for example, the light-conditioning means preferably comprises a bundle of light-transmitting fiber optics and a cylindrical light-diffusing tube. The fiber optics have their respective outputs distributed to cooperatively project a variable-width line of substantially uniformly intense specular light through an elongate rectangular entrance slot of the light-diffusing tube. The width of the light line, at the entrance slot of the tube, varies in a manner so that radiant power along the light line changes in accordance with the reciprocal of an anticipated falloff in irradiance at a linear image sensor.

The light-diffusing tube has an elongate rectangular exit slot angularly disposed with respect to the entrance slot and immediately adjacent an object plane. By sending a given amount of specular light into the tube through the entrance slot at a given point longitudinally thereof, the tube passes diffuse light, through the exit slot, concentrated at a corresponding region longitudinally thereof. With this arrangement, a scanning line of diffuse light of variable power is projected through the exit slot onto the adjacent object plane, the radiant power in the line of diffuse light varying along its length in accordance with the variation in the light power in the line of specular light entering the diffusing tube.

Thus, the irradiance of the line of scanning light projected onto the object plane varies with the reciprocal of the anticipated falloff at the image plane. Accordingly, the irradiance at the linear image sensor, arising from focusing the scanning line of light onto said sensor, is relatively uniform with field angle.

By varying the amount of light in an object plane as a function of field angle, the density value measured for a film pixel is independent of its field angle. This advantage, as well as other advantages of the invention, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

An object of the present invention is to provide an illumination system for image scanner apparatus that adjusts the amount of light in an object (film) plane as a function of field angle so that irradiance at an image sensor, arising from light in the object plane, is uniform. The invention is applicable to image scanner apparatus of the type including lens apparatus, having a given field of view, for imaging film onto an image sensor. Exemplary of image scanner apparatus of this type are an area scanner in which the lens apparatus images pixels in a desired area of a film simultaneously onto an area image sensor; a line scanner in which lens apparatus images a given line of film pixels simultaneously onto a linear image sensor; and a serial scanner, such as a laser flying-spot scanner or a CRT flying-spot scanner, in which a narrow beam of light undergoes a scanning motion, effected either optically or electronically, to cause lens apparatus to image one pixel at a time onto an image sensor.

An illumination system, in accordance with the invention, is disclosed herein for use with imaging apparatus of the line scanner type. In particular, the illumination system adjusts the amount of light in an object plane by varying the radiant power in a line of diffuse light as a function of field angle.

Figure 1:
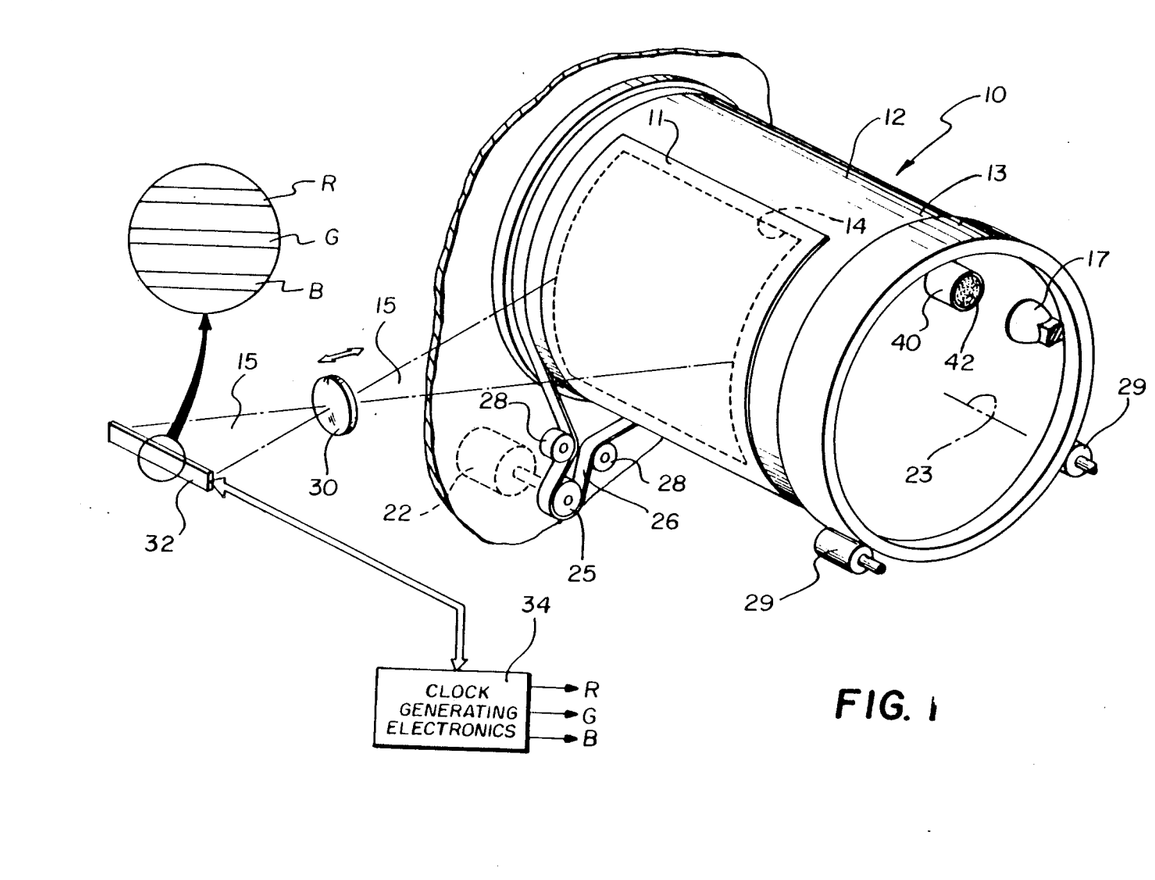
FIG. 1 is a perspective view of image scanner apparatus of the drum type.

FIG. 1 shows line scanner apparatus 10 of the drum type. Such scanner apparatus is the subject of U.S. patent application Ser. No. 241,687, filed on Sept. 8, 1988, and entitled IMAGE SCANNER APPARATUS OF THE DRUM TYPE HAVING AN EFFICIENT LINE-OF-LIGHT ILLUMINATION SYSTEM, the disclosure of which is incorporated herein by reference.

Film 11 to be scanned is bent to the curvature of a film-receiving surface 12 of a rotatable hollow drum 13. The drum 13 has an aperture 14 on its curved surface 12 that is larger than the area of the film image. Film-holder means, described in detail hereinafter, serves to mount film 11 with its image in alignment with the aperture 14.

An optical converter, located inside the drum 13 and described in detail hereinbelow, projects a line 15 of diffuse illumination through aperture 14—via free space—directly onto the film image. The line of diffuse light illuminates all pixels in a given row of the film image simultaneously, thereby enhancing the speed at which an image is scanned. To that end, a lamp 17, preferably of the halogen-tungsten type, provides light used for illuminating film 11.

The entire film image is scanned by moving film 11 one row of pixels at a time through the light line 15. To that end, a stepper motor 22 serves to rotate the drum 13 in small increments about its axis 23. For that purpose, the motor 22 rotates the drum 13 to move the film 11 in a line-scan direction—from the top of a film image to the bottom—via a driven pulley 25 and an endless belt 26 wrapped around the drum in an $\Omega$ configuration. A pair of idlers 28 functions to control belt tension. Rotatable cam followers 29 serve to locate the drum 13.

Lens apparatus 30 serves to focus an image of one row of film pixels at a time onto a charge coupled device (CCD) linear image sensor 32. An operator selects lens apparatus 30 for a variety of magnifications to control the width of a film image scanned.

In a preferred embodiment, the image sensor 32 includes an overlay comprising three parallel arrays of color filters—red (R), green (G) and blue (B). This "tri-linear" image sensor 32 further includes three corresponding parallel output registers which are coupled respectively to an output of one of the color filter arrays. Thus, the output of one of the registers corresponds to a R video signal, a second register to a G video signal, and the third register to a B video signal.

Clock generating electronics 34 function to control the CCD sensor 32 and to process its output signals to produce in a known manner a high-resolution video signal corresponding to the film image. The clock generating electronics 34 applies the R, G and B video signals to circuitry (not shown) for subsequent operations, such as to produce positive R, G and B color signals to provide a composite video signal for display on a video monitor (also not shown). A tri-linear image sensor array and corresponding clock generating electronics of the type disclosed herein are the subject of U.S. Pat. No. 4,278,995 entitled COLOR LINE SENSOR FOR USE IN FILM SCANNING APPARATUS, assigned to the assignee of this invention and the disclosure of which is incorporated herein by reference.

Figure 2:
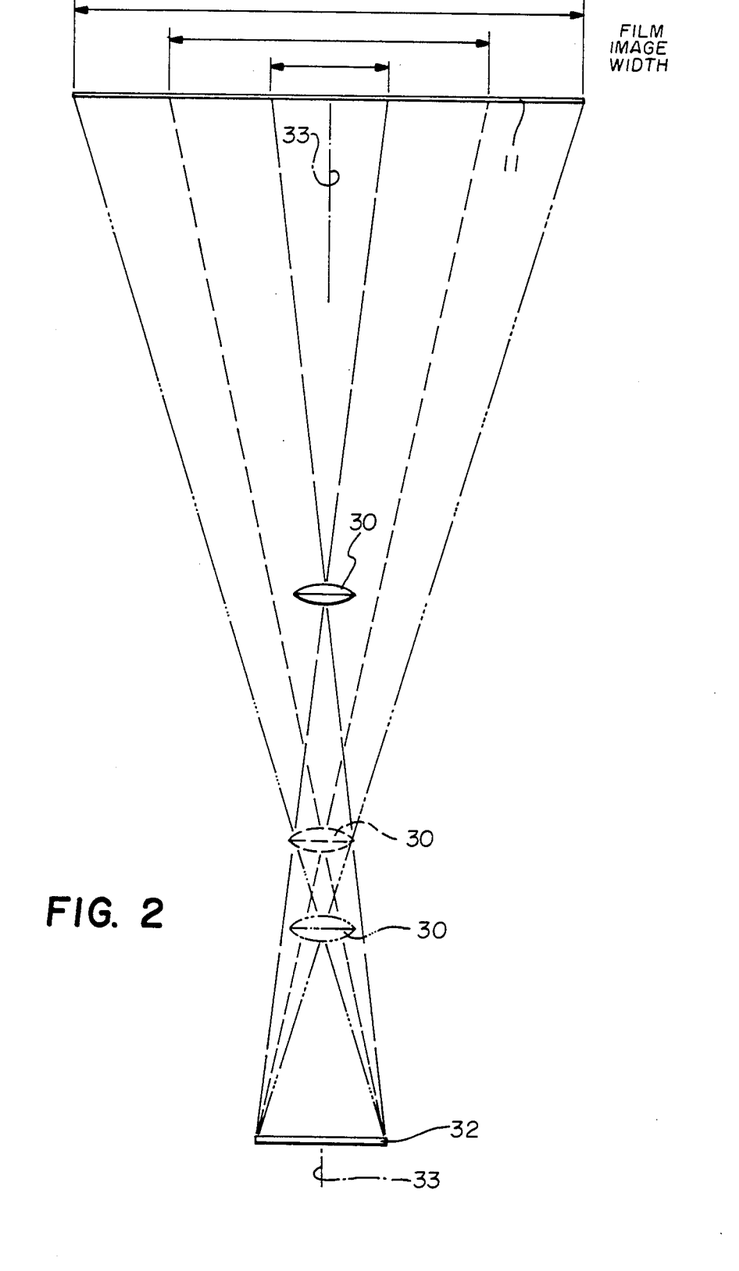
FIG. 2 illustrates the field of view of lens apparatus of the image scanner apparatus.

FIG. 2 shows the locations for lens apparatus 30, and its corresponding field of view, for focusing film images of three different widths onto the linear image sensor 32. It is known in the optics art that irradiance in an image plane decreases as field angle increases—the angle defined by a line connecting the centers of an object and its image, and the optical axis 33 of a lens. In particular, irradiance falls off, in proportion to the fourth power of the cosine of the field angle. Other factors such as lens vignetting are also known to contribute to irradiance falloff.

Figure 3:
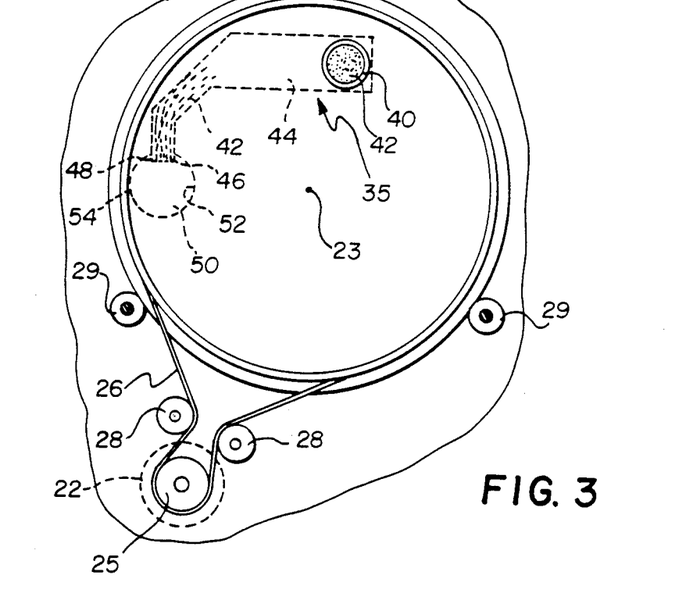
FIG. 3 is a side view, partially in cross section, of the image scanner apparatus.
Figure 4:
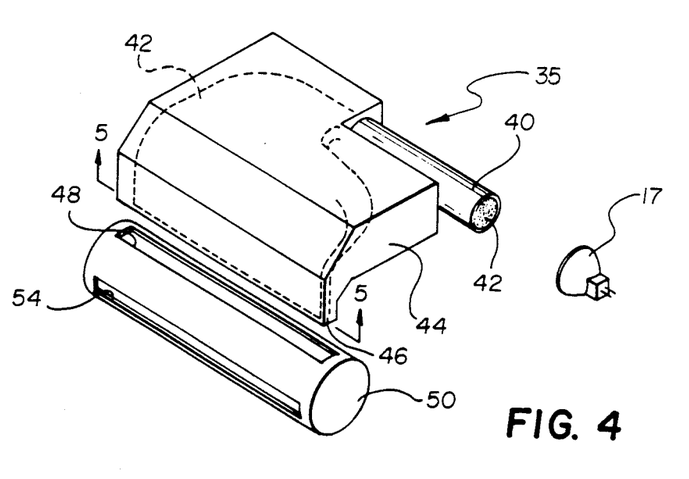
FIG. 4 is a perspective partially exploded view of optical converter apparatus for forming a line of diffuse illumination.
Figure 5A:
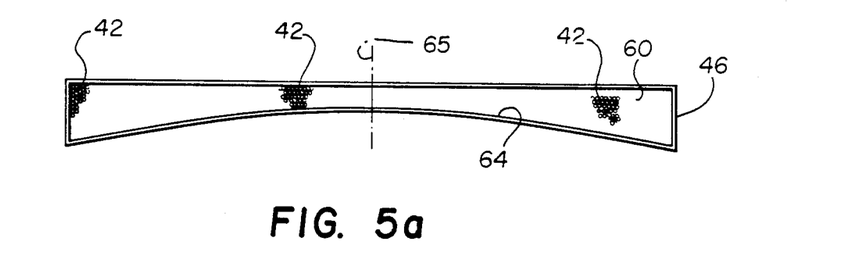
FIGS. 5(a), 5(b), and 5(c) are planar views, along the line 5—5 of FIG. 4, of converter apparatus for conditioning the radiant power in the line of diffuse illumination.
Figure 5B:
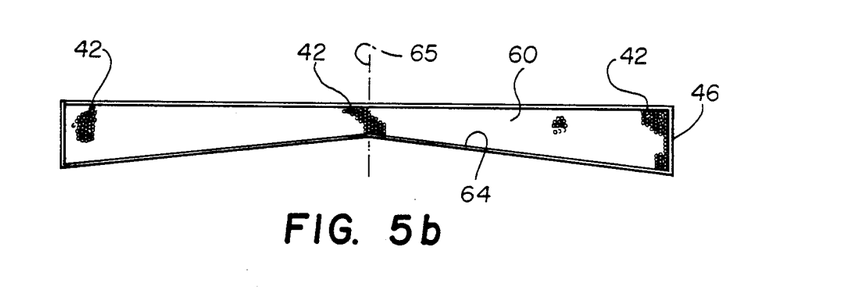
Figure 5C:
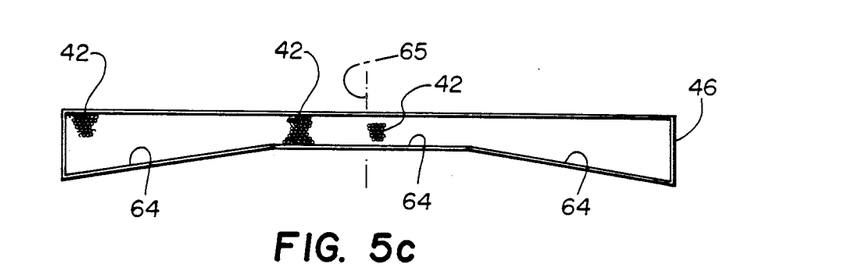
Figure 6A:
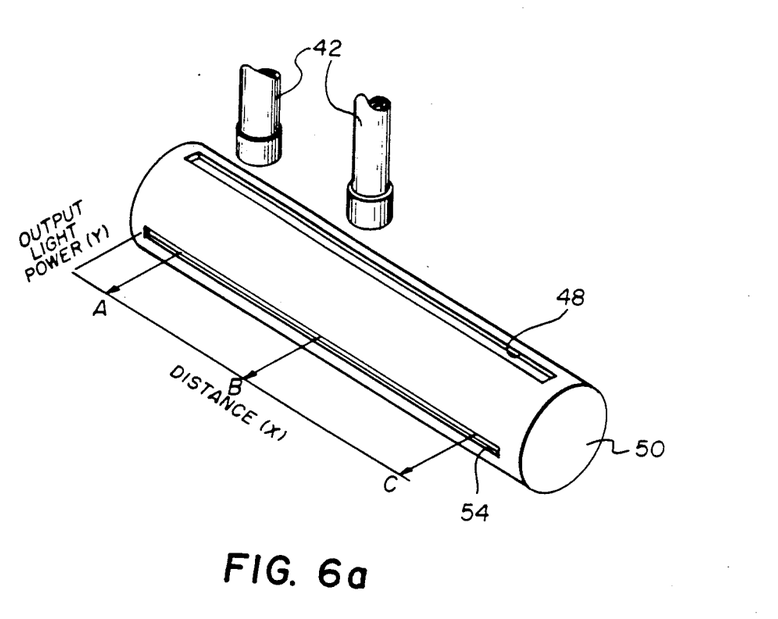
FIG. 6a is a perspective view of the converter apparatus and FIG. 6b is a graphical illustration useful in understanding the operation of the converter apparatus.
Figure 6B:
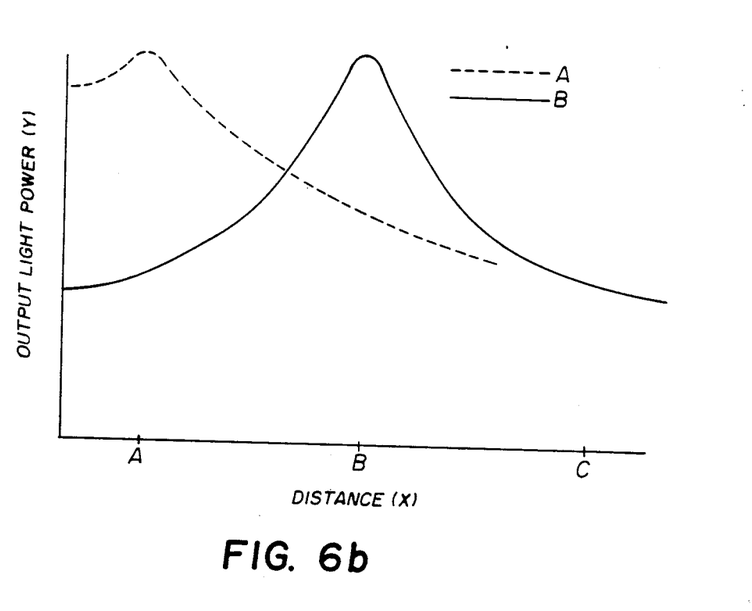
Figures 7, 7A:
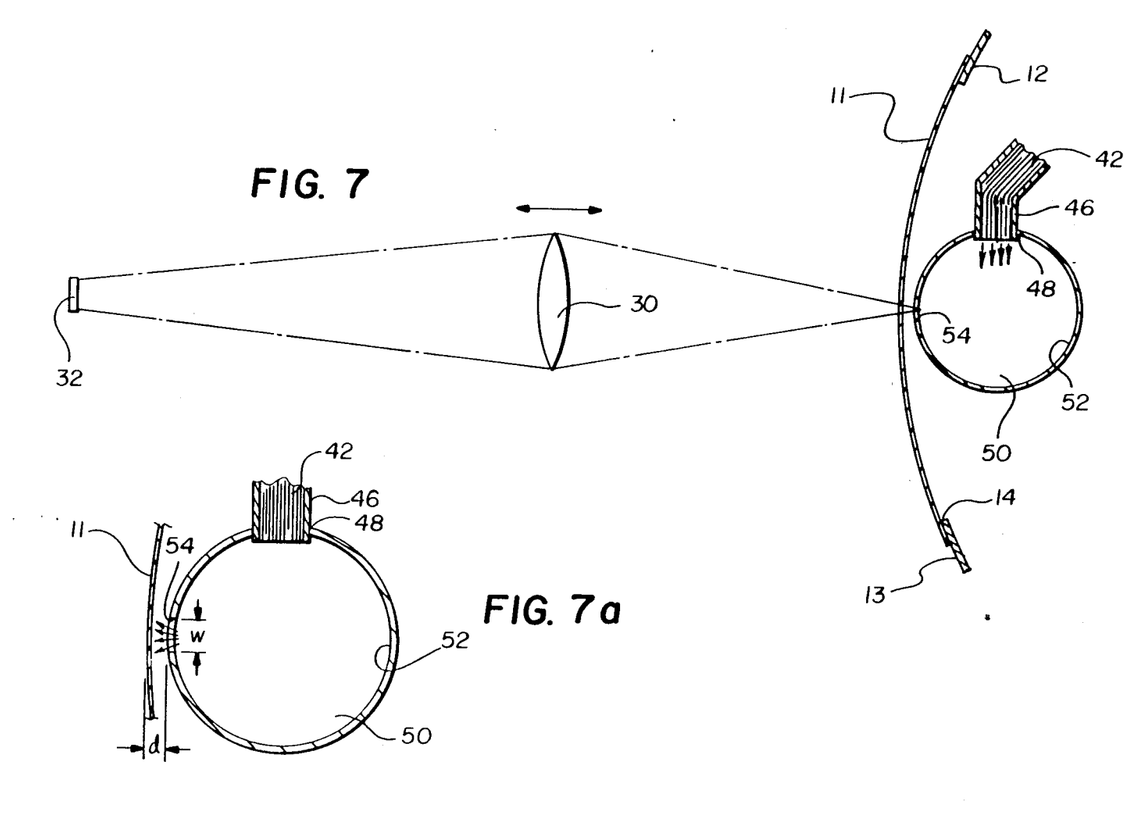
FIGS. 7 and 7a are, respectively, is a side elevation views illustrating the arrangement between the output of the converter apparatus and the film image plane.

FIGS. 3 through 7 illustrate the aforementioned optical converter, denoted 35, for illuminating film 11 with a line of diffuse light so that the irradiance along the image sensor 32, arising from light at the film plane, is uniform. For the purpose of first forming a line of light, a fiber optic bundle 40 (also shown in FIG. 1) serves to initially transform a pencil-shape beam of specular light, provided by the lamp 17, into a beam of line-like shape. To that end, the input end of the bundle 40 is aligned with the lamp 17, the diameter of the fiber optic bundle being substantially equal to the diameter of the specular light beam. The optic fibers, denoted 42, are unbundled inside a housing 44 and arranged with their respective output ends distributed along nose 46 which, as shown in FIGS. 3 and 7, faces downwardly within an elongate rectangular entrance slot 48 of a cylindrical light-diffusing tube 50. With this arrangement, light from the lamp 17 is spread out so that it enters the tube 50 through the rectangular slot 48 which extends longitudinally from one end of the tube to the next.

In addition to forming a line of light, the converter 35 further serves to adjust the radiant power in the light line 15 at the film plane so that irradiance along the linear image sensor 32 is uniform. In other words, the converter 35, insofar as falloff due to field angle is concerned, functions to produce a light line 15 whose irradiance, at the object plane (the film image plane), varies approximately as the inverse of the fourth power of the cosine of the field angle.

To that end, FIG. 5(a) shows that the nose 46 of housing 44 defines an elongate symmetrically shaped slot 60 that widens progressively toward each end from its middle. In particular, an arcuate inside surface 64 of the nose 46 is shaped to progressively widen the slot 60 approximately with the reciprocal of the fourth power of the cosine of the field angle. In a preferred embodiment of the image scanner apparatus 10, the maximum field angle of lens apparatus 30 is approximately ±12°. Accordingly, the width of the slot 60 at centerline 65, corresponding to a field angle of 0°, is approximately ninety percent (90%) of its width at both ends, which correspond, respectively, to field angles of plus and minus 12°.

FIG. 5(a) also shows that the fiber optics 42 are distributed throughout the slot 60. In particular, the respective outputs of the fiber optics 42 are arranged side by side generally in a common plane, to substantially fill the slot 60. In other words, the area of the slot 60 is equal to the size of the cross-section of the fiber optic bundle 40.

Since each fiber is approximately of the same diameter (50μ), the number of fibers in the slot 60, at any given distance on either side of centerline 65, is larger than the number of fibers at the centerline 65 by approximately the reciprocal of the fourth power of the cosine of the field angle corresponding to such given distance. Since the nose 46 fits within the entrance slot 48 of the diffusing tube 50, the radiant power transmitted through the slot 60, and therefore entering the diffusing tube 50, varies along the entrance slot in proportion to the reciprocal of the fourth power of the cosine of the field angle.

FIGS. 5(b) and 5(c) show alternate preferred embodiments for shaping the width of the slot 60 of nose 46 in a manner that is a linear piecewise approximation to the reciprocal of the fourth power of the cosine of the field angle. In FIG. 5(b), for example, the inside surface 64 consists of two linear sections wherein the width of the slot 60 varies linearly from a maximum at either end of the slot to a minimum—90% of the maximum—at centerline 65.

As shown in FIG. 5(c), the surface 64 consists of three sections of equal length wherein the slot 60 is a constant minimum width over the middle one-third of its length and linearly varies over the other two-thirds of its length to a maximum at each end.

Referring, now to FIG. 6a, light entering the diffusing tube 50 at a given point along the entrance slot 48, exits the tube concentrated in a corresponding region of the exit slot 54. For example, FIGS. 6a and 6b together show that light entering the tube 50 at a point A, near the left-hand end of the entrance slot 48, is concentrated in a region A at the corresponding end of the exit slot 54; similarly, light entering the tube 50 at a point B near the middle of the entrance slot 48 (in the linewise direction), exits the tube concentrated primarily at corresponding region B in the slot 54, with the shape of the distribution somewhat different from that at region A.

The shape of the output distribution, i.e. the impulse response, changes slowly as a function of the distance x. This shape can be computed using well-known Monte Carlo techniques, or, more straightforwardly, it can be measured. By sending light into slot 48 at different input points, and measuring the distribution along slot 54 for each input, a set of impulse functions can be determined. Since the impulse response changes only slowly along the slot, it need be measured at only a course spacing, for example, a spacing equal to the radius of the tube 50.

Once each of the impulse responses is known, the output of slot 54 for any input distribution along the slot 48 can be calculated by the principle of superposition. The most straightforward method of doing this is to describe the shape of the output of fiber optics 42 by a function containing a small number of parameters. Each of the shapes of the slot 60, shown in FIGS. 5(a) through 5(c), can be described in this manner. Then, the output distribution can be calculated. If needed, the shape of the slot 60 is then varied to obtain an output distribution that provides uniform irradiance along the image sensor 32.

It follows that since the radiant power through the entrance slot 48 varies with field angle, the radiant power of light transmitted through the rectangular exit slot 54 also varies with field angle. In particular, the power along the line of light leaving the slot 54 varies in proportion to the reciprocal of the fourth power of the cosine of the field angle.

Referring now to FIGS. 7 and 7a, the tube 50, in addition to projecting a relatively thin line of light of variable power onto the film image plane of the scanner apparatus 10, also serves to diffuse light received. To that end, the inside curved wall 52 of the tube 50 is preferably painted with a diffuse, highly reflective paint. Alternatively, a thin layer of white polyester film, manufactured by ICI Americas, Inc. of New Castle, Del. may cover the wall 52 for diffusing light.

The rectangular exit slot 54, which is approximately ninety degrees (90°) from the entrance slot 48 and generally parallel with the axis 23 of the drum 13, serves for directing a line of diffuse illumination toward the film image plane. FIG. 7a illustrates two effects associated with the position of the diffusing tube 50 relative to the film image plane. First, the larger the distance that the slot 54 is from the film image plane, the distance denoted d, the greater is the height of the film area over which the light line 15 is distributed. If the height of this film area is too large, light is wasted. Second, the angular spread of light, seen by a point on the film, decreases with distance d. If this angular spread is too small, light impinging on the film is no longer diffuse.

So that light is diffuse, without being unduly wasted, the exit slot 54 is positioned from the film plane a distance d which is approximately one-half the width, w, of the slot. In accordance with a preferred embodiment of the invention, the slot 54 is located approximately 1/20 of a centimeter from the film plane; thus, the width w of the slot 54 is approximately 1/10 of a centimeter.

As disclosed previously herein, Kodak Ektachrome 64 film exposed with an excellent lens can record information to 100 cycles per millimeter (mm). In this case, film pixel pitch should be 5 microns (μ) to extract all information. With such a high-definition film, it is not possible to control the width w of the slot 54 and the distance d to such minute dimensions to illuminate only one row of film pixels at a time. Nevertheless, by controlling the size of the slot 54 and its location relative to the film plane, and by mounting the film so that illumination can be projected through free space directly onto the film image, diffuse illumination is employed efficiently to limit cross talk and flare, while being free of Newton rings.

Figure 8:
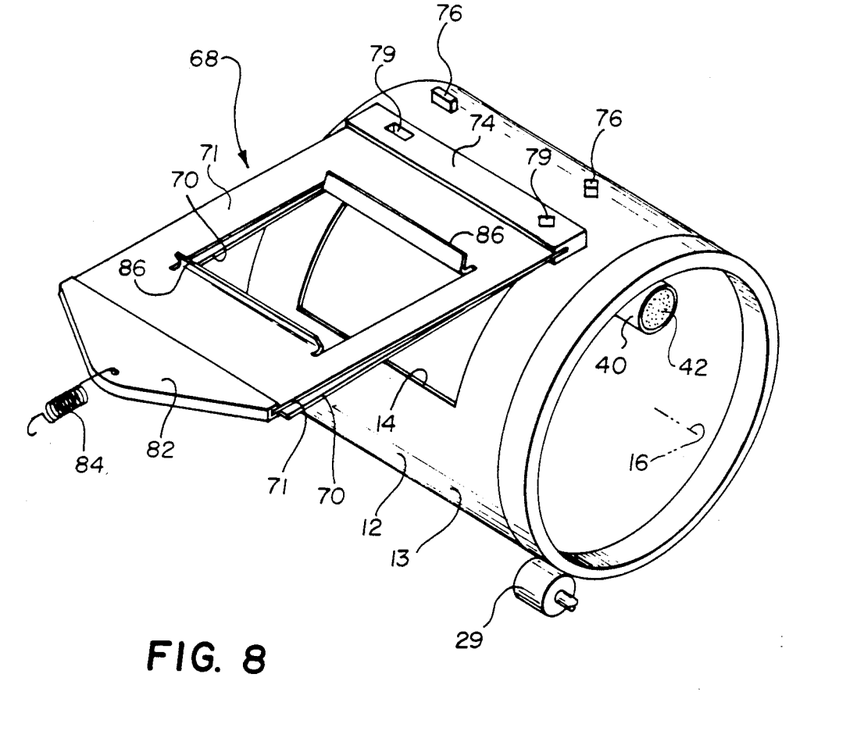
FIG. 8 is a holder for mounting film on the drum of the image scanner apparatus.

FIG. 8 shows apparatus 68 for loading film to be scanned onto the drum 13. To that end, film is sandwiched between a pair of flexible rectangular sheets 70, 71. Each sheet, which preferably is of aluminum, has a centrally aligned aperture 72 the dimensions of which correspond to the film image to be scanned. The film itself is somewhat larger than each aperture 72 so that only the border of the film—the non-image-bearing area—actually is sandwiched between the flexible sheets. A molded panel 74 holds the sheets 70, 71 together along a corresponding outer edge to provide a clam-shell effect for placing the film between the sheets.

A pair of studs 76, attached to the drum 13, serves for attaching the panel 72 to the drum. To that end, each stud 76 is shaped to be received by a correspondingly shaped locating hole 79 in the panel 72.

A spring-loaded lever 82 attached to an edge of the top sheet 71, at the end opposite from the panel 72, serves for holding both sheets 70, 71 tightly against the curved surface 12 of the drum 13. For that purpose, the free end of a strong spring 84 is attached to a projection (not shown) on the drum 13. In doing so, the spring 84 pulls the lever 82, and thereby wraps sheet 71 directly, and sheet 70 under the influence of sheet 71, around the surface of the drum; with this arrangement, film sandwiched therebetween is bent to the curvature of the drum, with each aperture 72 aligned with the film image, which, in turn, is in registration with aperture 14 of the drum 13.

FIG. 8 also shows that the top sheet 71 has a pair of spaced upwardly facing flanges 86 immediately adjacent opposed edges of the aperture 72 that are parallel with central axis 16. Each flange 86 serves to stiffen the sheet 71 along the corresponding edge of the aperture 72, and thereby more accurately holds film in a curved plane corresponding to the surface of revolution of the drum.

In operation, apparatus 10 scans continuous tone, color images recorded on reversal or negative films. A variety of film sizes can be handled, including films in a 120 and 135 format and film sheets of a size up to 20 by 25.4 centimeters. For handling the latter film size, the drum 13 has a circumference of approximately 63 centimeters, a longitudinal dimension of approximately 35 centimeters, and an aperture 14 of approximately 23 by 28 centimeters.

The size of each aperture 72 of sheets 70 and 71 is determined by the film to be scanned. To that end, multiple pairs of sheets 70, 71, each pair having an aperture 72 of appropriate size, are used to mount the variety of films to be scanned.

An operator selectively positions lens apparatus 30 to control the width of the film image film image width up to 5.7 centimeters.

Preferably, the linear image sensor 32 has 8000 pixels for each of the R, G, and B sensors. Accordingly, lens apparatus 30 provides a scanner resolution of approximately 400 pixels per centimeter for a film image up to 20 centimeters wide, 800 pixels per centimeter for a film image up to 10 centimeters wide, and 1400 pixels per centimeter for an image 5.7 centimeters wide.

The invention has been described in detail with reference to the figures; however, it will be appreciated that variations and modifications are possible within the spirit and scope of the invention. Patentable features disclosed but not claimed herein are disclosed and claimed in aforementioned, and U.S. patent application Ser. No. 241,687, entitled IMAGE SCANNER APPARATUS OF THE DRUM TYPE HAVING AN EFFICIENT LINE-OF-LIGHT ILLUMINATION SYSTEM, filed on Sept. 8, 1988.

What is claimed is:

1. In image scanner apparatus including a linear image scanner, and lens apparatus having a given field of view to focus a line of light in an object plane onto said linear image sensor, the improvement comprising:
    (a) a source of light having an irradiance profile; and
    (b) light-conditioning illuminator apparatus interposed between said light source and said object plane having (1) an input arranged adjacent said light source to receive substantially all of the light radiating from said light source, and (2) an output, facing said object plane, distributed to radiate the light received in a line-like pattern in said object plane wherein the amount of radiant power along the line varies progressively as a function of the reciprocal of the anticipated irradiance along said image sensor arising when said lens apparatus focuses a line of light of uniform power.

2. Image scanner apparatus as claimed in claim 1 wherein said light-conditioning illuminator apparatus includes a bundle of light-transmitting optical fibers having (1) their respective inputs cooperatively distributed facing said light source, and (2) corresponding outputs cooperatively distributed to radiate the light received in the line-like pattern.

3. Image scanner apparatus as claimed in claim 2 wherein said light-conditioning illuminator means further includes a cylindrical tube having (1) a first longitudinally extending entrance slot, and (2) a second longitudinally extending exit slot, and further having an internal light diffusing surface to cause a given amount of light entering through said entrance slot at a given point longitudinally thereof to pass generally a like amount of diffuse light through the exit slot at a corresponding point longitudinally thereof, said cylindrical tube being interposed between said optical fiber bundle and said object plane with the entrance slot arranged to receive said fiber optic outputs and the exit slot arranged to face said object plane, whereby the irradiance at said linear image sensor, arising from the scanning line of light said lens apparatus actually focuses on said sensor, is relatively uniform with field angle.

4. Image scanner apparatus as defined in claim 3 wherein the entrance slot and the exit slot of said cylindrical tube are rectangular.

5. Image scanner apparatus as claimed in claim 2 wherein:
    (a) said light source produces a pencil-shaped beam of light; and
    (b) said fiber optic bundle has its optical fibers collectively arranged to form a circular input end, the diameter of said circular input end being substantially equal to the diameter of the light beam.

* * * * *